Feb. 6, 1962 L. DAVIS 3,019,685
MUSICAL DRUMS
Filed March 6, 1959 2 Sheets-Sheet 1
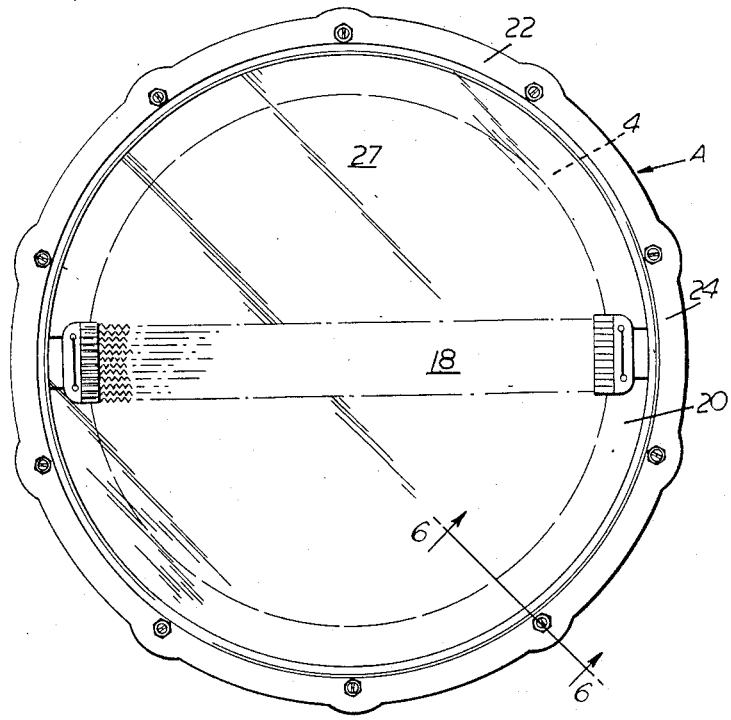
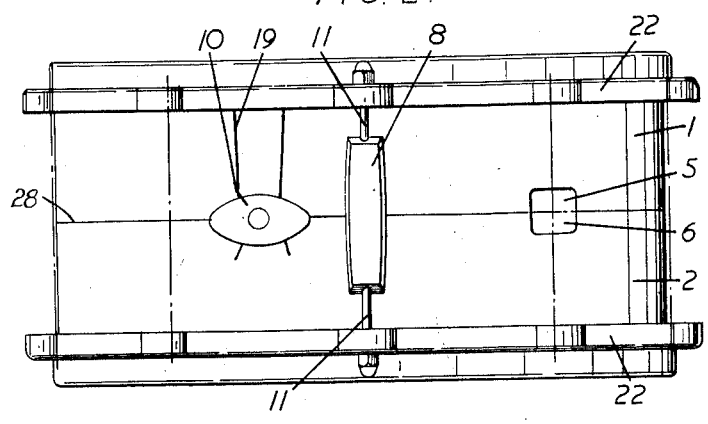
Inventor
Lewis Davis
By
Watson, Cole, Grindle + Watson
Attorneys Feb. 6, 1962   L. DAVIS   3,019,685
MUSICAL DRUMS
Filed March 6, 1959   2 Sheets-Sheet 2
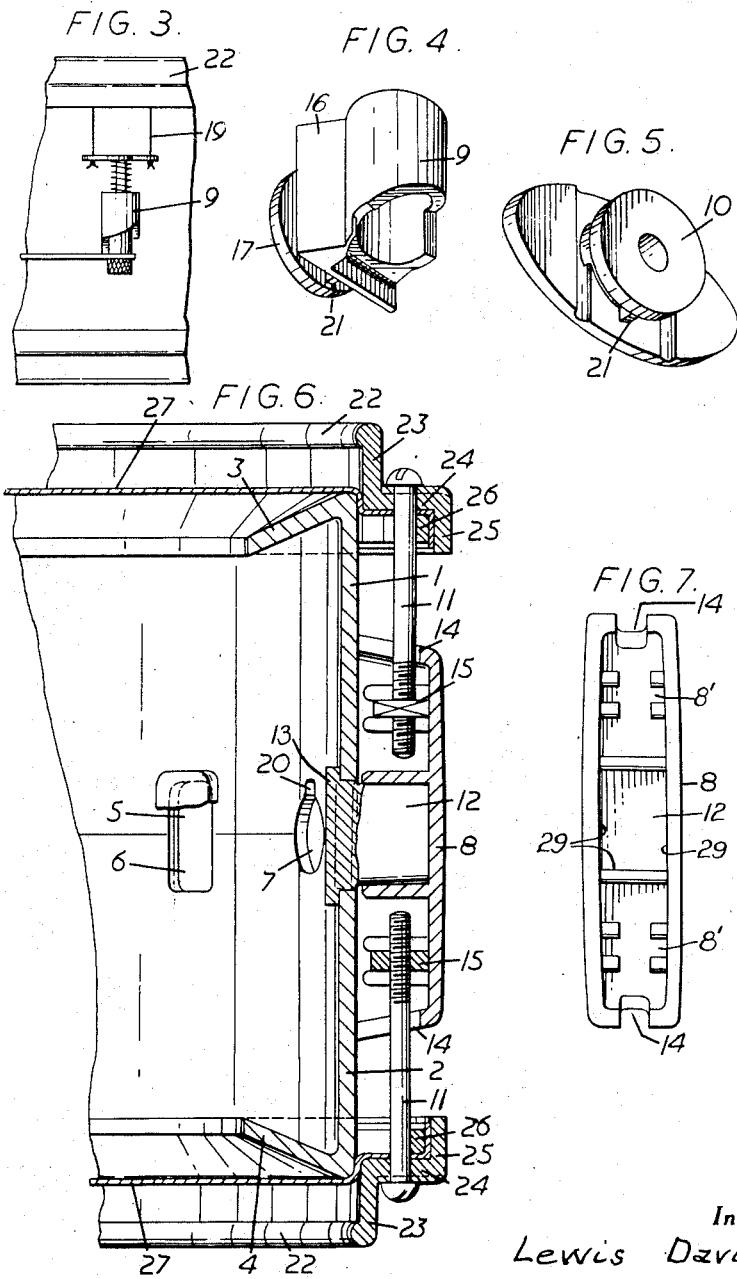
Inventor
Lewis Davis
By
Waters, Cole, Grindle & Waters
Attorneys

United States Patent Office 3,019,685
Patented Feb. 6, 1962

3,019,685
MUSICAL DRUMS
Lewis Davis, 114–116 Charing Cross Road,
London, England
Filed Mar. 6, 1959, Ser. No. 797,769
7 Claims. (Cl. 84—411)

This invention relates to musical drums particularly to side drums, and has for its object to construct a major portion of the parts of plastics thereby reducing the cost of manufacture.

According to this invention, a shell for a side drum made of plastics by injection moulding with an inwardly and downwardly directed flange at each end is formed in halves or sections on a circumferential plane and recesses are provided in the non-flanged end of each half or section so that the halves or sections can be held together with the recesses coinciding to form a shell with apertures in which lugs for the tightening screws and snares can be secured.

The lugs for the tightening screws are provided with screw threaded holes or nuts in which the tightening screws can be engaged and with a shank and enlarged portion whereby the shank can be located in the recesses in the halves or sections of the shell before holding them together so that the lugs are retained in the apertures by the enlarged portions.

The head is of synthetic plastics resembling vellum and hoops of somewhat Z-shape in cross-section with holes in the web and a metal ring engageable in the hoop are provided The invention will be clearly understood from the following description aided by the accompanying drawings, in which:

FIGURE 1 is an underview of the drum. FIGURE 2 is a view in the direction of the arrow A in FIGURE 1. FIGURE 3 is a detail view of the snares adjuster. FIGURE 4 is an enlarged perspective view of the body of the snare adjuster. FIGURE 5 is an enlarged perspective view of the snare hold. FIGURE 6 is an enlarged section of part of the drum shown in FIGURE 1, and FIGURE 7 is an enlarged back view of a screw lug.

In the example shown in the accompanying drawings, the shell of a side drum is formed in halves 1, 2 on a circumferential plane 28, the outer edge of each half shell 1, 2 being formed with an inwardly and downwardly directed flange 3, 4 and the inner edge with a series of oblong recesses 5, 6 at equal distances apart and two half-circular recesses 7, so that the halves 1, 2 can be connected by cement or held together with the recesses 5, 6 and 7 coinciding to provide a series of square openings in which side lugs 8 and two circular holes in which the snare fittings 9, 10 can be located and held therein.

The half portions of the shell are injection moulded plastics.

The side lugs 8 for the tightening screws can be constructed in various ways, and as one example, the lug 8 can be of oblong shape with its chamfered ends and curved on the inside to the curve of the shell is provided with a separate shank 12 having an enlarged portion 13 secured in a recess in the lug 8, or can be moulded therewith. A hole 14 is provided longitudinally through the lug 8 and two recesses 8' are made in the lug 8 in each of which is a non-rotatable internally threaded metal nut 15 with the screwed holes in the nuts coinciding with the longitudinal hole 14 in the lug 8 so that the tightening screws 11 can be passed through the holes 14 at each end of the lug 8 and screwed into the respective nuts 15.

The usual cam operated snare fitting 9 with a shank 16 and enlarged portion 17 can be fitted in one of the circular recesses 7 in the shell and the other fitting 10 to which the cords of the snare 18 are secured may be similarly engaged in the other circular recess in the other side of the shell, the cords 19 connecting the snare 18 to the fittings passing through holes 29 in the head.

Each of the half circular recesses 7 are provided with a slot 20 and the snare fittings 9, 11 with a rib 21 for locating the fittings in the recesses.

Each hoop 22 is formed with a ring portion 23 which extends outwards from the end of the shell when applied to the shell and is of slightly larger diameter than the outside diameter of the shell. This first ring portion 23 is formed with a web portion 24 projecting outwardly from the first ring portion 23 in which are holes for the tightening screws 11, the web portion 24 being formed with a second ring portion 25 at right angles to the web portion 24 which projects in the opposite direction to the first ring portion 23. In the corner of the hoop 22 formed by the web 24 and second ring portion 25 is a removable metal ring 26 of oblong cross-section.

The head 27 consists of a circular piece of synthetic plastics resembling vellum of larger diameter than the shell and is formed with a series of holes around the edge corresponding to the holes in the hoop 22.

The edge portion of each head 27 is located in a hoop 22, a portion lying on the underside of the web portion 24 of the hoop 22 with the holes in the web 24 coinciding with the holes in the head 27. The metal ring 26 is inserted in the hoop 22 pressing the head 27 against the web 24 and against the second ring portion 25 of the hoop 22.

The lugs and snare fittings are located in the recesses in one half and the other half of the shell positioned and cemented or held to the first half with its recesses coinciding with the recesses in the other half to form a shell with the lugs and snare fittings held in place between the halves of the shell. A head 27 and hoop 22 is positioned over each end of the shell and the tightening screws 11 passed through the holes in the web portion 24 of the hoop 22 and head 27 and screwed into the respective lugs 8 and by screwing-up the tightening screws 11 at one end of the shell that head 27 can be tightened by moving the hoop 22 towards the lugs 8 drawing the head 27 over the end of the shell. The head at the other end can be similarly tightened by turning the screws 11 on that side.

What I claim as my invention is:

1. A drum comprising two cylindrical shell portions composed of synthetic plastic material and abutting one another in axial alignment on a circumferential plane, means on one portion cooperating with means on the other portion to define a plurality of apertures, lugs for receiving tightening screws, shanks on said lugs each extending through one of said apertures, means on said shanks cooperating with means on said lugs to prevent axial displacement of said shanks in said apertures and to ensure precise axial alignment of said portions, a circumferentially arranged rim surrounding the free end of each portion and carrying a drum head, and tightening screws extending through said rims and cooperating with screw threads in said lugs for urging said rims towards one another to lock said portions and said lugs in their operative positions and to tension said drum heads.

2. A drum according to claim 1, in which the said portions cooperate to define further apertures, a shank on a corresponding snare fitting extending through each further aperture, with means on said snare fitting on the shank thereof cooperating to prevent axial displacement of said snare fitting and for assisting the said alignment of said portions, said lugs and the body portions of said snare fittings being composed of synthetic plastic material.

3. A drum comprising two cylindrical shell portions composed of synthetic plastic material and abutting one another in axial alignment on a circumferential plane, means on one portion cooperating with means on the other portion to define a plurality of apertures, lugs for receiving tightening screws, shanks on said lugs each extending through one of said apertures, means on said shanks cooperating with means on said lugs to prevent axial displacement of said shanks in said apertures and to ensure precise axial alignment of said portions, a circumferentially arranged rim surrounding the free end of each portion, a radially outwardly extending annular portion on each rim, holes in said extending portion, tightening screws extending through said holes and cooperating with screw threads in said lugs for urging said rims towards one another for locking said portions and said lugs in their operative positions and for tensioning the drum heads, a further annular portion on said outwardly extending portion, extending axially inwardly of the drum and perpendicularly to the last mentioned portion to define an annular recess, a drum head carried by each said rim and extending into said recess, a metallic ring located in said recess radially outwardly of said tightening screws and urging the peripheral portion of said drum head against said further annular portion, and an acute angled shoulder on each shell portion, abutting the inner surface of the corresponding drum head.

4. A drum according to claim 3, in which said portions cooperated to define further apertures, a shank on a corresponding snare fitting extending through each further aperture, with means on the snare fitting and on the shank thereof cooperating to prevent axial displacement of said snare fitting and for assisting said alignment of said shell portions, the lugs and the body portions of the snare fittings being composed of synthetic plastic material.

5. A drum comprising two cylindrical shell portions composed of synthetic plastic material and abutting one another in axial alignment on a circumferential plane, means on one portion cooperating with means on the other portion to define a plurality of apertures, lugs for receiving tightening screws, shanks on said lugs each extending through one of said apertures, means on said shanks cooperating with means on said lugs to prevent axial displacement of said shanks in said apertures and to ensure precise axial alignment of said portions, a rim surrounding each free end of each said portion and having apertures receiving tightening screws for cooperating with said lugs for displacing said rims towards one another, an annular recess defined by each said rim, a drum head extending into each said recess, a removable ring in each said recess, disposed axially outwardly of said tightening screws and urging the corresponding drum head against a wall of said recess, and an acute angled annular shoulder on each said portion, bearing against the inner surface of the corresponding drum head.

6. A drum according to claim 1, in which the lugs are composed of synthetic plastic material and have recesses therein, each recess non-rotatably carrying a nut, said means on said shanks being constituted by enlarged portions thereof and the apertures and the shanks being of rectangular cross-sectional configuration.

7. A drum in which the shell consists of two cylindrical portions composed of synthetic plastic material and abutting one another in axial alignment on a circumferential plane, said two portions being fixed in their operative positions by means of two circular rims each surrounding and abutting the free edge of one of the portions and each carrying tightening screws cooperating with lugs carried in apertures defined by cooperating means on said portions, each rim defining an aperture in which is disposed radially outwardly of said screws, a ring urging the peripheral portion of a drum head against a portion of said rim, an annular edge presented by each of said two cylindrical portions bearing against the corresponding drum head, and means on said lugs extending through said apertures and being adapted to cooperate with said lugs to ensure precise axial alignment of said two cylindrical portions.

References Cited in the file of this patent

UNITED STATES PATENTS

| | | |
|---|---|---|
| Re. 24,733 | Erwin | Nov. 10, 1959 |
| 663,854 | Boulanger | Dec. 18, 1900 |
| 794,658 | Boulanger | July 11, 1905 |
| 1,456,242 | Leedy | May 22, 1923 |
| 2,092,980 | Ludwig | Sept. 14, 1937 |
| 2,172,578 | Gladstone | Sept. 12, 1939 |
| 2,285,269 | Grolimund | June 2, 1942 |
| 2,609,722 | Way | Sept. 9, 1952 |
| 2,779,227 | Slingerland | Jan. 29, 1957 |